Figure 3:
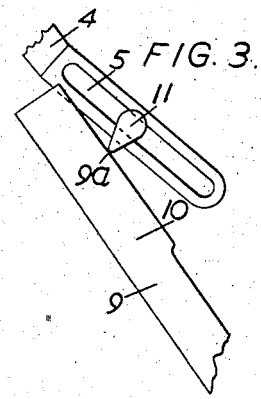

June 23, 1959
G. F. RAPER
2,891,287
APPARATUS FOR DETECTING AND CORRECTING DEPARTURES
FROM STANDARD IN THE THICKNESS OR DIAMETER OF
LONGITUDINALLY TRAVELLING TEXTILE SLIVERS
Filed Oct. 8, 1954
2 Sheets-Sheet 1
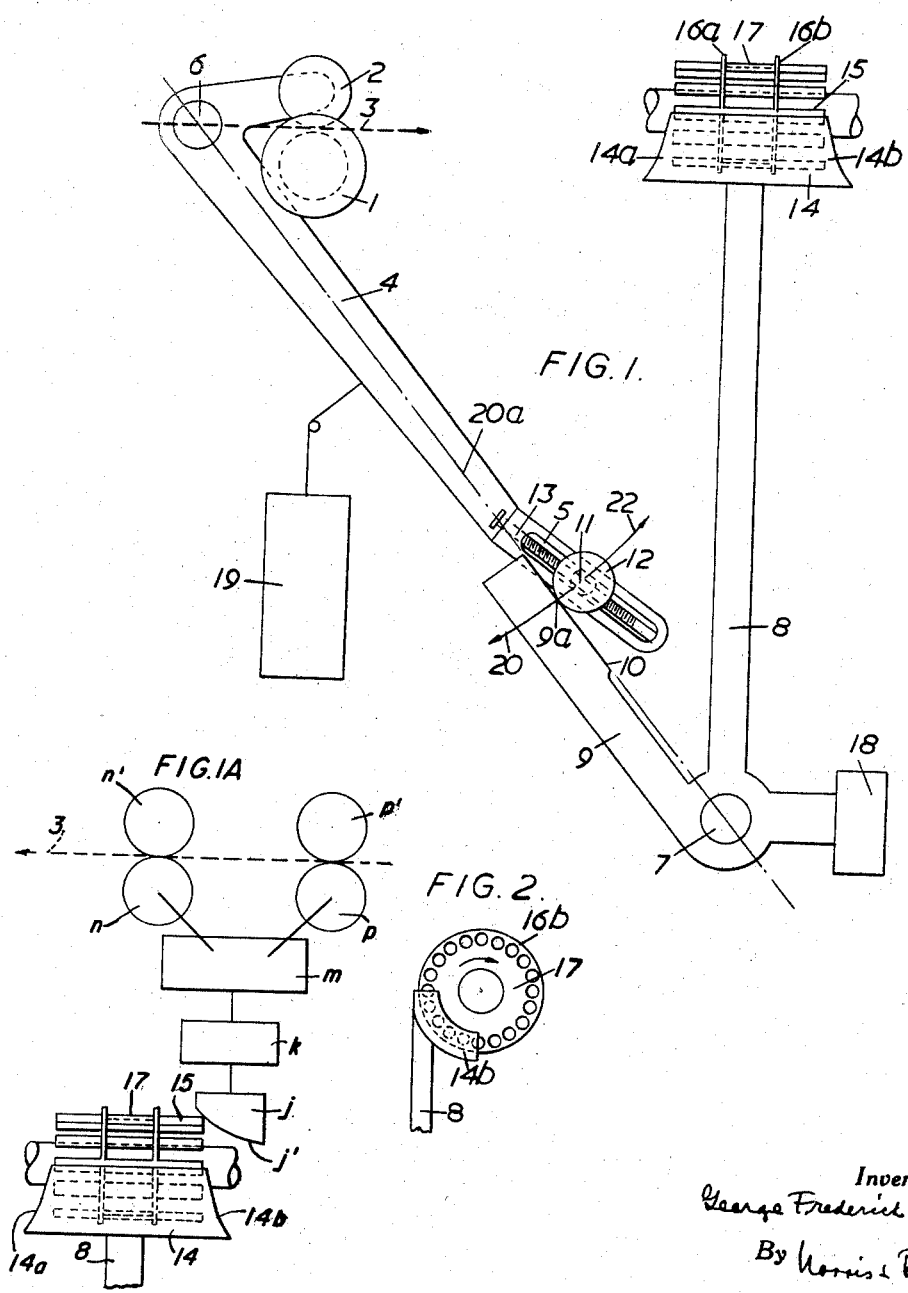
Inventor
George Frederick Raper
By Morris & Bateman
Attorneys June 23, 1959  G. F. RAPER  2,891,287
APPARATUS FOR DETECTING AND CORRECTING DEPARTURES
FROM STANDARD IN THE THICKNESS OR DIAMETER OF
LONGITUDINALLY TRAVELLING TEXTILE SLIVERS
Filed Oct. 8, 1954  2 Sheets-Sheet 2

*Inventor*
George Frederick Raper
By
*Attorneys*

United States Patent Office 2,891,287
Patented June 23, 1959

2,891,287

APPARATUS FOR DETECTING AND CORRECTING DEPARTURES FROM STANDARD IN THE THICKNESS OR DIAMETER OF LONGITUDINALLY TRAVELLING TEXTILE SLIVERS

George Frederick Raper, Masham, near Ripon, England, assignor of one-half to T. M. M. (Research) Limited, Lancashire, England Application October 8, 1954, Serial No. 461,222

12 Claims. (Cl. 19—70)

The invention has reference to apparatus for detecting and correcting irregularities of thickness of a textile sliver, such apparatus being of the kind in which a sliver passes through a drafting unit controlled by the mechanical movements of a relay which is responsive to irregularities sensed by a detector located in advance of, or which is part of, the drafting unit, and in which the relay comprises a train of axially movable parallel rods, slidably mounted about the periphery of a carrier or rod wheel which is rotated so that the rods move along a path at right angles to their axes, and which are actuated by a rod-setting element so that they project beyond a datum position by an amount which is proportional to the instantaneous thickness of the sliver by which the detector is influenced, so as to displace to a greater or less extent a transmitting element which bears against the projecting parts of the rods, the said displacements of the transmitter being employed to control, by means of a variable-speed gear, the degree of draft introduced into said sliver by the drafting unit. Examples of apparatus of this kind are described in U.S. Patent No. 1,132,316, dated March 16, 1915; U.S. Patent No. 2,681,475, dated June 22, 1954; British Patents Nos. 710,957 and 711,501, and in U.S. application Serial No. 303,385, now Patent No. 2,746,093, dated May 22, 1956.

In the examples mentioned of apparatus of this kind, the rod-setting element referred to takes the form of two curved plates disposed on either side of the rod wheel and connected together on to a rod-setting arm which has to-and-fro movement and which movement is passed on to the rods by the curved plates so that the rods are moved in and out, parallel to the rod wheel axis. So that the rods may be set projecting from the rod wheel by the curved plates, these plates at their edge where the rods leave them in the circumferential travel are exactly rod length apart and it will be seen that the movement of the curved plates and hence of the rod-setting arm is limited by the plates coming in contact with the rod wheel, as the rods are moved to their full extent one way or the other.

In the further examples mentioned the rod-setting arm is pivoted at the end remote from the rod-wheel and it is connected to and actuated by a link-rod which link at its other end is connected to the arm on which the floating measuring roller, i.e. the detector, is mounted. The lengths of the various arms or levers are arranged so that the movements of the floating measuring roller are magnified and the rods are moved in the rod-wheel by the curved setting plates a distance many times greater than the original movement of the detector roller.

It is known, for example, from U.S. Patent No. 1,132,316 hereinbefore referred to to make the link between the detector arm and the rod-setting arm adjustable as to length, so that when the floating measuring roller average position is known for the average thickness of slivers passing through, the rod setting arm may be adjusted to its central position so as to give space for an equal rise or fall in thickness either side and hence in rod movement.

It has been found by the present inventor that when this adjustment is performed it is, for optimum sliver thickness correction, also necessary to alter the magnification between the detector rollers and the final variable speed gear so as to maintain the correct thickness to speed ratio, greater magnification being required for thinner slivers and less magnification for thicker slivers. This change of magnification is not provided for in apparatus publicly known prior to the present invention, thus limiting any machine to one average thickness of entering slivers. The usefulness of the machine is thus limited. Alternatively, if the link is lengthened or shortened to accommodate a different sliver thickness then true correction of thickness by the apparatus cannot be claimed.

The present invention has, as one of its features, the provision of means by which, when the rods are centralised for a new average sliver thickness, the correct appropriate magnification is automatically set at the same time.

A further object of this invention is to allow excessive thickness of sliver to pass through the measuring roller without damaging the machine.

According to a broad feature of the present invention there is provided, in apparatus of the kind referred to a rod-setting element which is adapted to be adjusted in relation to average sliver thickness such adjustment also causing, for that average sliver thickness, substantially correct magnification between the detector and the rod-setting element.

According to another feature of the invention there is, in apparatus of the kind referred to, the provision between the detector and the rod-setting element of a link comprising two pivoted arms, one arm being connected to the detector and the other arm being connected to the rod-setting element, there being a face on one arm and a contact element on the other arm, the two being normally held in contact, and the contact element on the one arm being capable of being adjusted to give another setting of the other arm and, by that adjustment, is caused to move along the said face so as to lengthen or shorten the distance of the point or area of contact from either or both of the pivots of the detector arm and/or the rod-setting arm, and so alter the magnification by the correct, calculated or desired amount.

In apparatus according to the invention there may be provision between the detector and the rod-setting element of a connection which will open when the rod-setting element reaches its limit of movement in order that the detector may continue freely to move if caused to do so by excessive sliver thickness.

One form of apparatus in accordance with the invention is illustrated diagrammatically in the accompanying drawings in which Fig. 1 is a side elevation of an embodiment of the invention, and Fig. 1A is a side elevation of a transmission and adjustable operating means used in connection therewith.

Fig. 2 is a detail end elevation of the rod wheel forming part of the transmission and adjustable operating means.

Variations of the embodiment of the invention are illustrated diagrammatically in Figs. 3 to 8 which are all side elevations.

Referring to Fig. 1, 1 and 2 are a pair of measuring rollers through which the sliver 3 is adapted to pass. In this form, 1 is a flanged driven roller, in between which flanges is positioned the free roller 2, which roller is carried on a two-armed lever 4 pivoted at 6, and loaded by spring or weight 19. At the lower extremity of the long arm of lever 4, is formed a slot 5 which lies at a determined angle to the line 20a passing through the centres of pivot 6 and pivot 7 which is the pivot of the rod-setting arm 8. This arm has an extension 9 carrying a straight surface 10 lying coincident with or at a determined angle to the line 20a. In the slot 5 is a slidable stud 11 carrying a small wheel 12 which rests against straight surface 10. A screw 13 may be provided to position the stud 11 in the slot 5. A weight 18 is shown attached to arm 8 extending on the opposite side of pivot 7 from arm 9.

The upward extension of arm 8 carries the transmission and adjustable operating means shown in Fig. 1A which comprises the rod-setting plate 14 whose edges 14a and 14b encompass the rods 15 slidably mounted in the flanges 16a and 16b of the rod wheel 17.

A "transmitter" j movable in a vertical plane and having a suitably inclined or curved under surface j' engages the right hand end of the rods 15. As will be understood, the further the rods 15 project under the surface j' the greater will be the distance through which the "transmitter" is moved in a vertical plane, and vice versa, as the rod wheel 17 is rotated. The vertical movements of the "transmitter" are arranged to be transmitted, if desirable, through a suitable form of construction of relay k, to a variable speed gear indicated at m, and capable of controlling the relative speeds of rotation of two pairs of driven rollers n, n' and p, p' between which a drafting action is exerted on the sliver.

The action of the apparatus described in Figs. 1 and 2 is as follows:

Variations in the thickness of the sliver or slivers 3 as it passes between rollers 1 and 2, cause roller 2 which is loaded on to the sliver by weight 19, to move up and down thereby giving motion to wheel 12 as shown by arrows, 20, 22. The action of weight 18 is to overcome the sliding friction of rods 15 in flanges 16a and 16b, and so keep surface 10 in contact with wheel 12. Arms 9 and 8 thereby follow the movement of wheel 12 as does the rod-setting plate 14. Thus the movements of roller 2 position the rods 15 in the flanges 16a and 16b as the rods leave the plates 14 due to the rotation of the rod wheel 17 as shown by arrow in Fig. 2.

Let the setting of stud 11 in slot 5 be such that thickness variations in sliver 3 cause the rods to be set in such a way that their mean position corresponds approximately with their central position; that is in such a way that the rod-setting plate edges 14a and 14b approach equally to flanges 16a and 16b at the maximum and minimum sliver thicknesses encountered.

If now it is desired to process a sliver or slivers of a different mean thickness it can be seen that the danger will arise of an edge 14a or 14b coming up against a flange 16a or 16b and rendering the rod-setting mechanism inactive. If, for example a sliver of a less mean thickness is processed, the average position of the setting plate 14 will lie to the left, as seen in Fig. 1, of the centre line of the rod wheel 17, and thin places in the sliver 3 might cause edge 14b to come to rest against flange 16b. The invention provides for this eventuality in that by moving stud 11 down the slot 5 the arms 9 and 8 will rotate slightly clockwise as seen in Fig. 1, thereby centralizing the rods for this new reduced mean sliver thickness. As this is done, the point of contact 9a moves down the surface 10, thereby increasing in a predetermined manner the magnification of the lever system transmitting movements of roller 2 to the rods 15. The angle of the slot 5 is such that at all times this magnification is correct for the particular mean sliver thickness which sets the rods 15 centrally. Thus, for example, a 10% change in sliver thickness of a thin sliver can be made to produce the same rod movement as a 10% change in sliver thickness of a thick sliver.

It will furthermore be seen that if an excessively thick place in the sliver passes between rollers 1 and 2, the rod-setting plate will rest harmlessly against flange 16a whilst wheel 12 lifts clear away from surface 10.

It will be appreciated that the positions of the rods 15 in the rod wheel 17 control the drafting of the sliver by the mechanism comprising the "transmitter" j, relay k, variable speed gear m and the rollers n, n' and p, p', but such mechanism may alternatively consist of or comprise the mechanism described and shown in British Patents Nos. 710,957 and 711,501 and U. S. application Serial No. 303,385, now Patent No. 2,746,093 aforesaid.

If required the wheel 12 may be replaced by a point of contact formed as an extension of the stud 11 as shown in Fig. 3.

Figure 4:
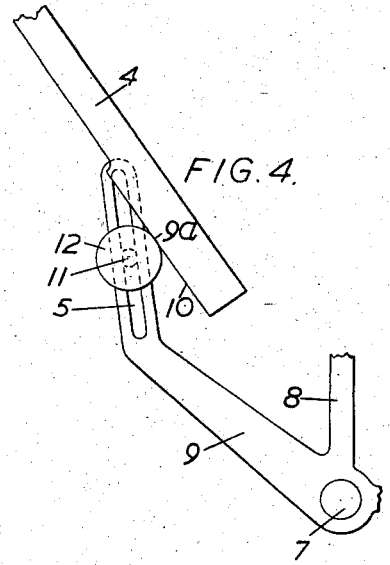

A further variation is illustrated in Fig. 4 wherein the positions of the straight surface 10 and the wheel or point 12 are reversed.

Figure 5:
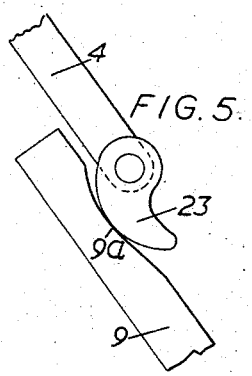

Fig. 5 illustrates a further variation wherein the stud and wheel and the slot may be replaced by a suitably shaped cam 23 whose rotation produces the same result.

Figure 6:
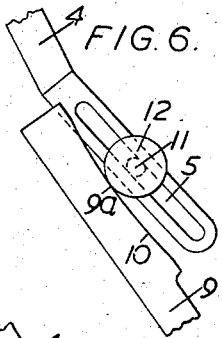

Fig. 6 shows the surface 10 as curved, if required to compensate for the radial movement of the levers and so that a determined relationship may be obtained between movement of roller 2, and the resulting movement of rods 15.

Figure 7:
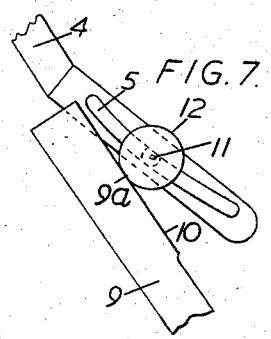

Fig. 7 shows how the slot 5 may be slightly curved, if required, so that a determined relationship may be obtained between movement of the point of contact 9a away from surface 10 and movement of 9a along surface 10.

Figure 8:
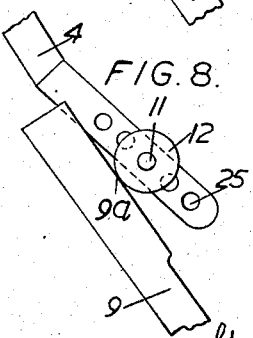

Fig. 8 shows how the slot 5 may be replaced by a series of holes 25 into which the stud 11 may be plugged to give a series of separate contact positions to achieve the same result.

Having thus described my invention, what I claim as new and desire to secure by Letters Patent is:

1. Apparatus for automatically adjusting an adjustable operating means of a machine in accordance with variations in the thickness of the material to be acted on by the operating means, comprising in combination, roller means for measuring the thickness of the material acted on, means for recording the thickness variations in the material to be acted on by the operating means, said recording means comprising a rotatably mounted driven wheel and a plurality of substantially identical rods slidably mounted on said driven wheel along the peripheral portion thereof for linear movement substantially parallel to the axis of rotation of said driven wheel, link means for shifting said rods on said wheel in correspondence to variations in the thickness of the material acted on, said link means comprising two arms, means for urging said arms towards each other, a surface formed on one of said arms and a contact element carried by the other of said arms, said other arm having means thereon on which said contact element is mounted for adjustment in a path inclined relatively to said surface whereby said contact element can be adjusted to vary the position of engagement with said arms and thereby determine the relative disposition and effective lengths of said arms, one of said arms being connected to said roller means measuring thickness of the material acted on, and the other of said arms being connected to means acting directly on said rods of said recording means, and transmission means engaging said recording means and the adjustable operating means for adjusting the latter in response to the thickness variations recorded by said recording means.

2. Apparatus as defined in claim 1 in which said contact element is in separable engagement with said surface.

3. Apparatus as defined in claim 2 in which said surface is formed on the arm connected to said roller means and said contact element is mounted on the arm connected to said means acting directly on said rods.

4. Apparatus as defined in claim 3 in which said contact element comprises a roller mounted for adjustment on means defining a path inclined relative to said surface at a predetermined angle on a portion of said arm which is connected to the means acting directly on said rods.

5. Apparatus as defined in claim 4 in which said roller is mounted for slidable adjustment in a slot formed in said portion of said arm.

6. Apparatus as defined in claim 1 in which said surface is formed on the arm connected to the means acting directly on said rods, and said contact element is mounted on the arm connected to said roller means.

7. Apparatus as defined in claim 6 in which said contact element comprises a roller mounted for adjustment on means defining a path inclined relative to said surface at a predetermined angle on a portion of said arm which is connected to said roller means.

8. Apparatus as defined in claim 7 in which said roller is mounted for slidable adjustment in a slot formed in said portion of said arm.

9. Apparatus as defined in claim 7 in which a series of holes is formed in said portion of said arm to receive said roller.

10. Apparatus as defined in claim 1 in which said contact element is mounted for slidable adjustment in a slot formed in one of said arms.

11. Apparatus as defined in claim 10 in which said slot is curved so as to approach nearest to said other arm midway of its length.

12. Apparatus as defined in claim 1 in which a series of holes on a center line which is inclined relative to one of said arms is formed in the other of said arms to receive said contact element.

References Cited in the file of this patent

UNITED STATES PATENTS

| | | |
|---|---|---|
| 1,132,316 | Eves | Mar. 16, 1915 |
| 2,681,475 | Raper | June 22, 1954 |
| 2,746,093 | Raper | May 22, 1956 |